May 31, 1955 I. MOLNAR 2,709,719

AUTOMATIC TELEPHONE SYSTEM EMPLOYING ROTARY LINE SWITCHES FOR CONNECTING CALLING LINES TO NUMERICAL SWITCHES

Filed July 14, 1953 5 Sheets-Sheet 1

INVENTOR.
IMRE MOLNAR

BY [signature]

ATTY.

INVENTOR.
IMRE MOLNAR
BY Mc Watters Owen
ATTY.

INVENTOR.
IMRE MOLNAR
BY [signature]
ATTY.

INVENTOR.
IMRE MOLNAR
BY McWatters Owen.
ATTY.

May 31, 1955 I. MOLNAR 2,709,719

AUTOMATIC TELEPHONE SYSTEM EMPLOYING ROTARY LINE SWITCHES FOR CONNECTING CALLING LINES TO NUMERICAL SWITCHES

Filed July 14, 1953 5 Sheets-Sheet 5

INVENTOR.
IMRE MOLNAR

BY [signature]

ATTY.

United States Patent Office 2,709,719

Patented May 31, 1955

2,709,719

AUTOMATIC TELEPHONE SYSTEM EMPLOYING ROTARY LINE SWITCHES FOR CONNECTING CALLING LINES TO NUMERICAL SWITCHES

Imre Molnar, Chicago, Ill., assignor to Automatic Electric Laboratories, Inc., Chicago, Ill., a corporation of Delaware Application July 14, 1953, Serial No. 367,895

14 Claims. (Cl. 179—18)

Figure 1:
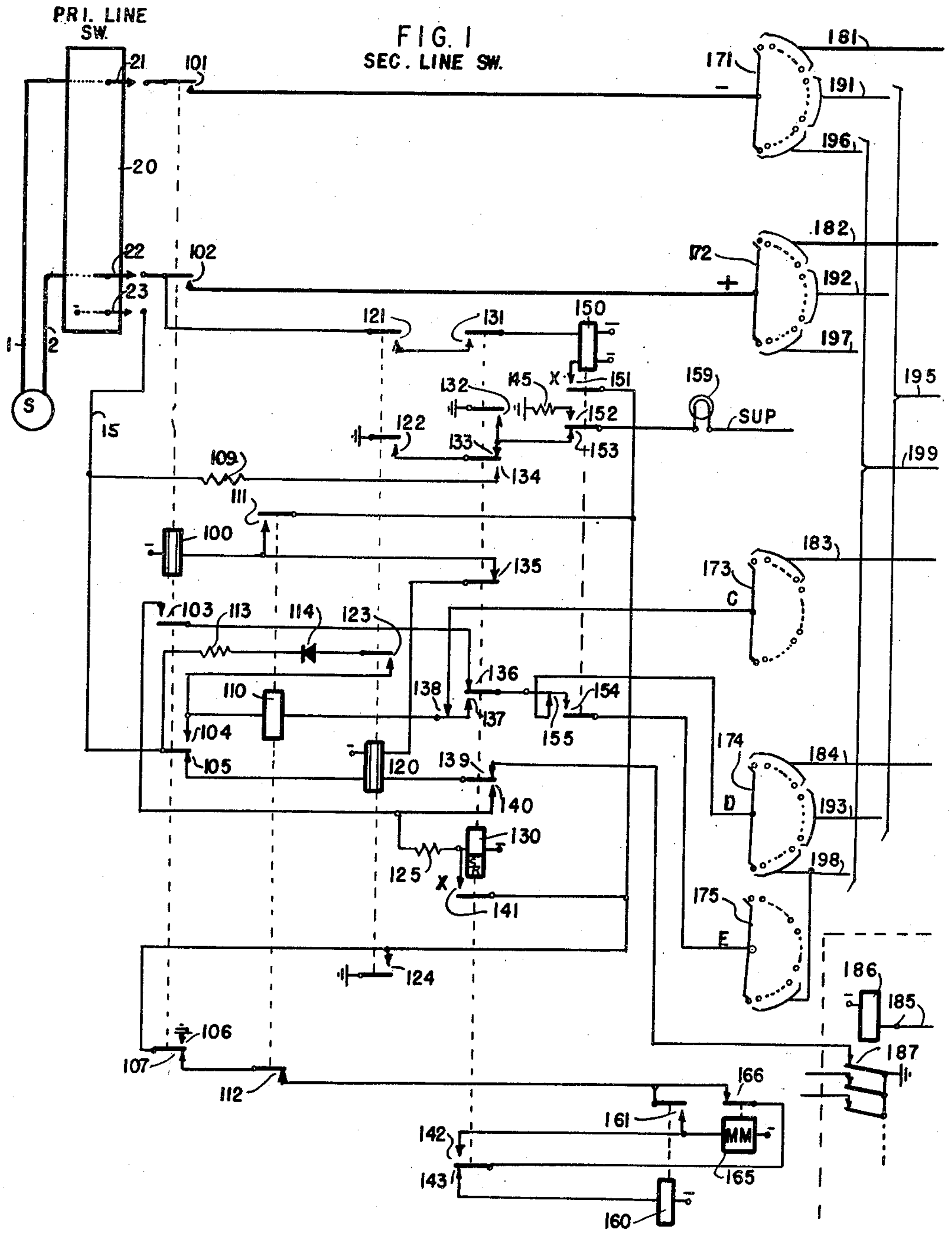

This invention relates in general to automatic telephone systems, and in particular to automatic telephone systems wherein rotary line switches are employed for connecting calling lines to the impulse responsive, or "numerical" switches. It may be considered as a companion invention to that shown and described in my Patent 2,557,388, issued June 19, 1951, and the impulses received from the dial are repeated over the negative talking conductor in similar manner.

One of the features of the referred to prior patent was the use of a special finder-selector switching link at a branch exchange, in which a Strowger linefinder was coupled with a novel discriminating drop-back Strowger selector, arranged to absorb a number of digits as required, in order to provide universal numbering. Upon the first seizure of this selector, and before any dialling had occurred, an auxiliary single-motion switch forming part of the selector, automatically found an outgoing trunk to the main exchange, and seized an incoming selector thereat. The drop-back selector and the distant selector both responded to the office selecting digit or digits, under control of the line relay of the drop-back selector. For third digit cut-in, on local calls, right and left normal post springs on the drop-back selector caused it to release after each of the first two digits, the outgoing trunk being released after the second digit. The third digit then operated the drop-back selector alone. This selector then rotated automatically to find a local second selector, and the call was completed through the branch office switch train. On a call to the main exchange, the drop-back selector and the distant selector again responded to the first two digits, but following the distinguishing second digit, the drop-back selector neither released nor rotated. The remaining digits operated only the distant switch train.

For first digit cut-in, as on calls to a toll operator over a separate group of trunks, the dialling of a specially assigned first digit caused a vertical bank provided on the discriminating drop-back selector to close a circuit to the cut-in relay. The selector then rotated at once automatically on the selected level, and released the seized regular trunk to the main exchange.

To provide cut-in on local calls on the fourth digit rather than the third, thus absorbing the first three digits, the vertical bank was again employed, together with a slight change in the wiring of the drop-back selector. Thus on the third digit the release magnet was again operated, this time through the vertical bank, and the outgoing trunk was disconnected at the same time, with cut-in on a local level occurring on the fourth digit.

The main object of the present invention is to provide facilities similar to the foregoing, and others, for a branch exchange in which access to the numerical switches is had through rotary lineswitches, rather than through finder-selector links.

A feature of the invention is the provision of a novel digit-absorbing discriminating repeater directly accessible to the lineswitches, and which may be arranged to transfer the call to the local switch train after varying numbers of digits have been dialled, depending on the prior insertion or non-insertion of jumpers at a small number of jumper points provided in the repeater circuit.

Another feature of the invention is the use of a novel rotary lineswitch circuit providing first access to a group of discriminating repeaters and second access to a group of local first selectors, with means controlled from a seized repeater for driving the lineswitch off the repeater arc of the bank and onto the local selector arc, as soon as the repeater has determined that it is not to be included in the call.

A further feature of the invention is the provision of means for stepping the lineswitch at a higher rate of speed when driven off of a seized repeater, so as to reduce the hunting time between digits.

Another feature of the invention is the novel manner in which the repeater controls the preceding lineswitch, to cause the reoperation of the lineswitch and the release of the repeater.

Other objects and features of the invention will be apparent from the following specification and claims, when considered together with the accompanying drawings comprising Figures 1 to 7 inclusive, which show in schematic diagram form, sufficient of the equipment to enable the invention to be readily understood.

Fig. 1 shows a subscriber station and a primary lineswitch in block diagram form, and the circuit of the special secondary lineswitch of the invention.

Figure 2:
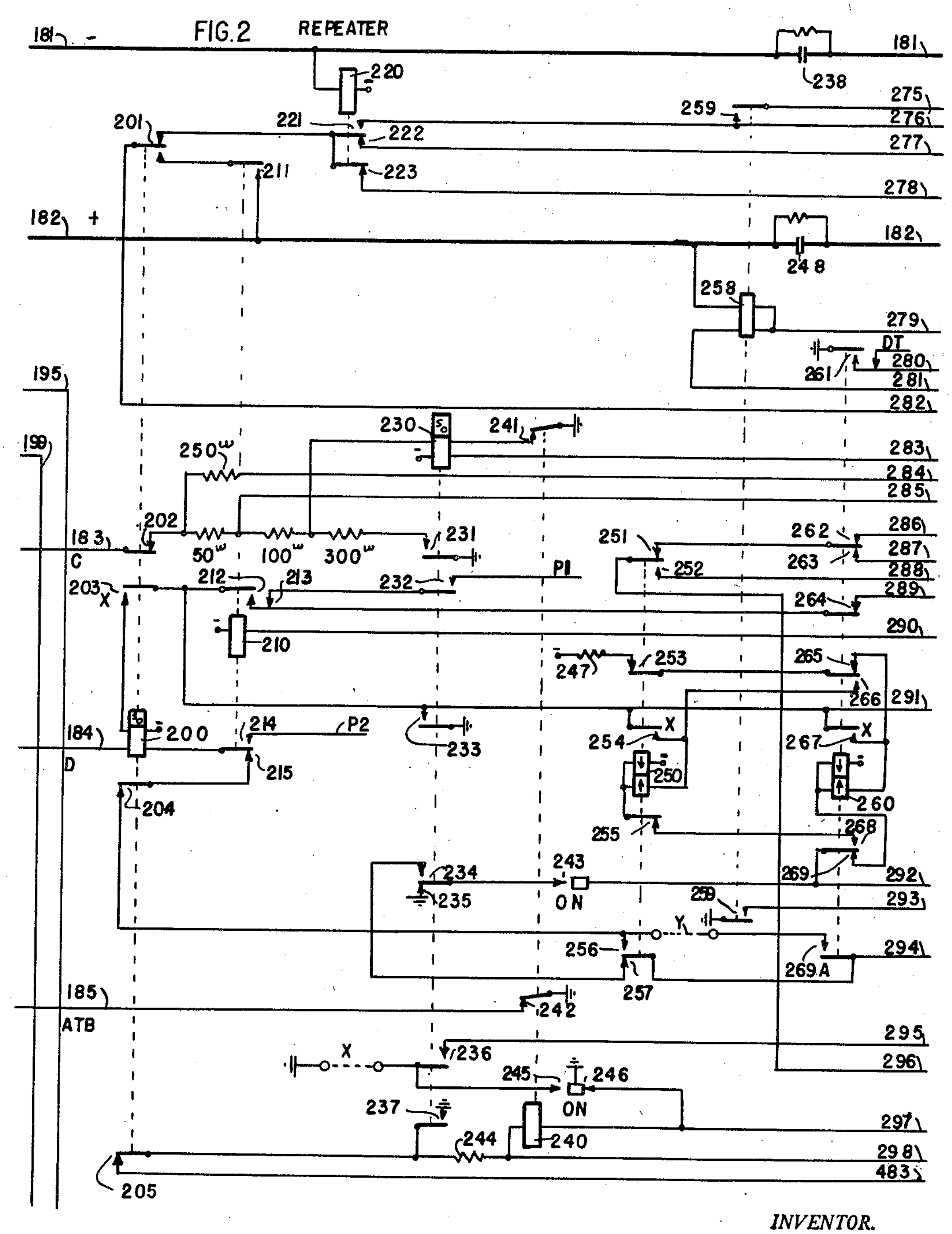

Fig. 2 which goes to the right of Fig. 1 shows a portion of the discriminating repeater of the invention.

Figure 3:
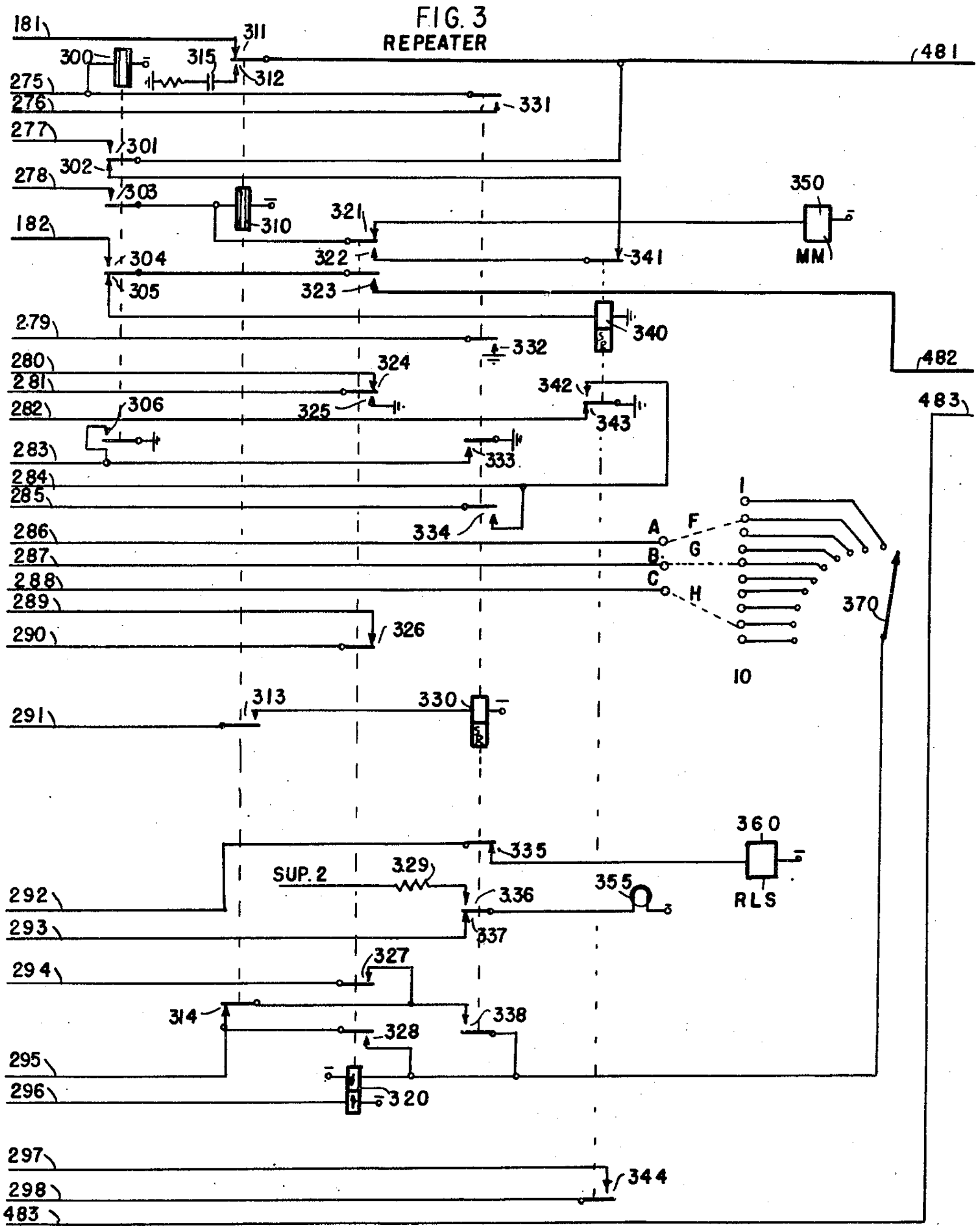

Fig. 3 which goes to the right of Fig. 2 shows the remainder of the circuit of the discriminating repeater.

Figures 4, 5:
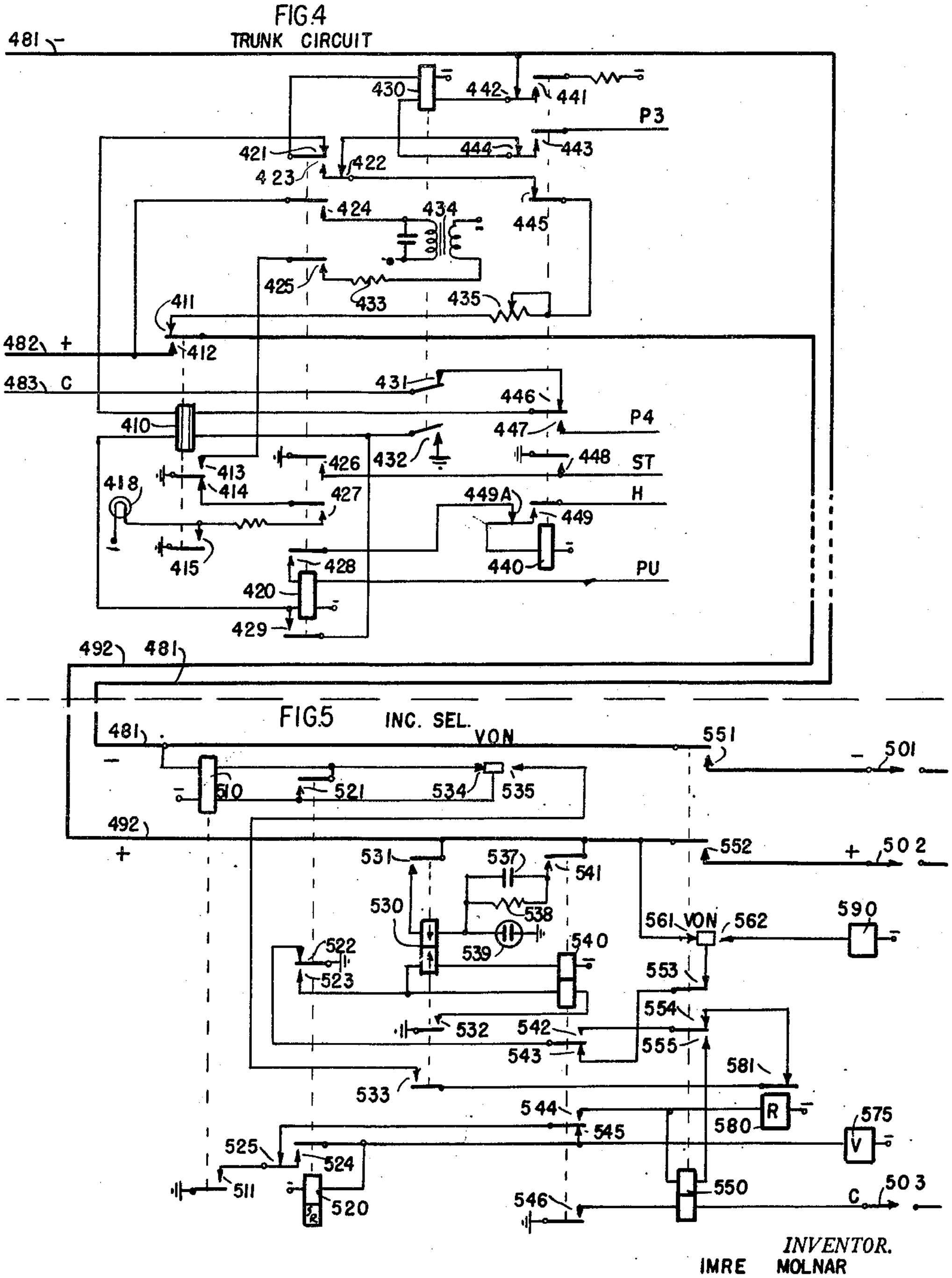

Fig. 4 which goes to the right of Fig. 3, and which corresponds to Fig. 13 of Patent 2,557,388 shows an outgoing trunk circuit directly connected to the repeater.

Fig. 5 which is shown with Fig. 4, and which corresponds to Fig. 14 of Patent 2,557,388 with certain features omitted to simplify the drawing, represents a main exchange incoming selector associated with Fig. 4.

Figures 6, 7:
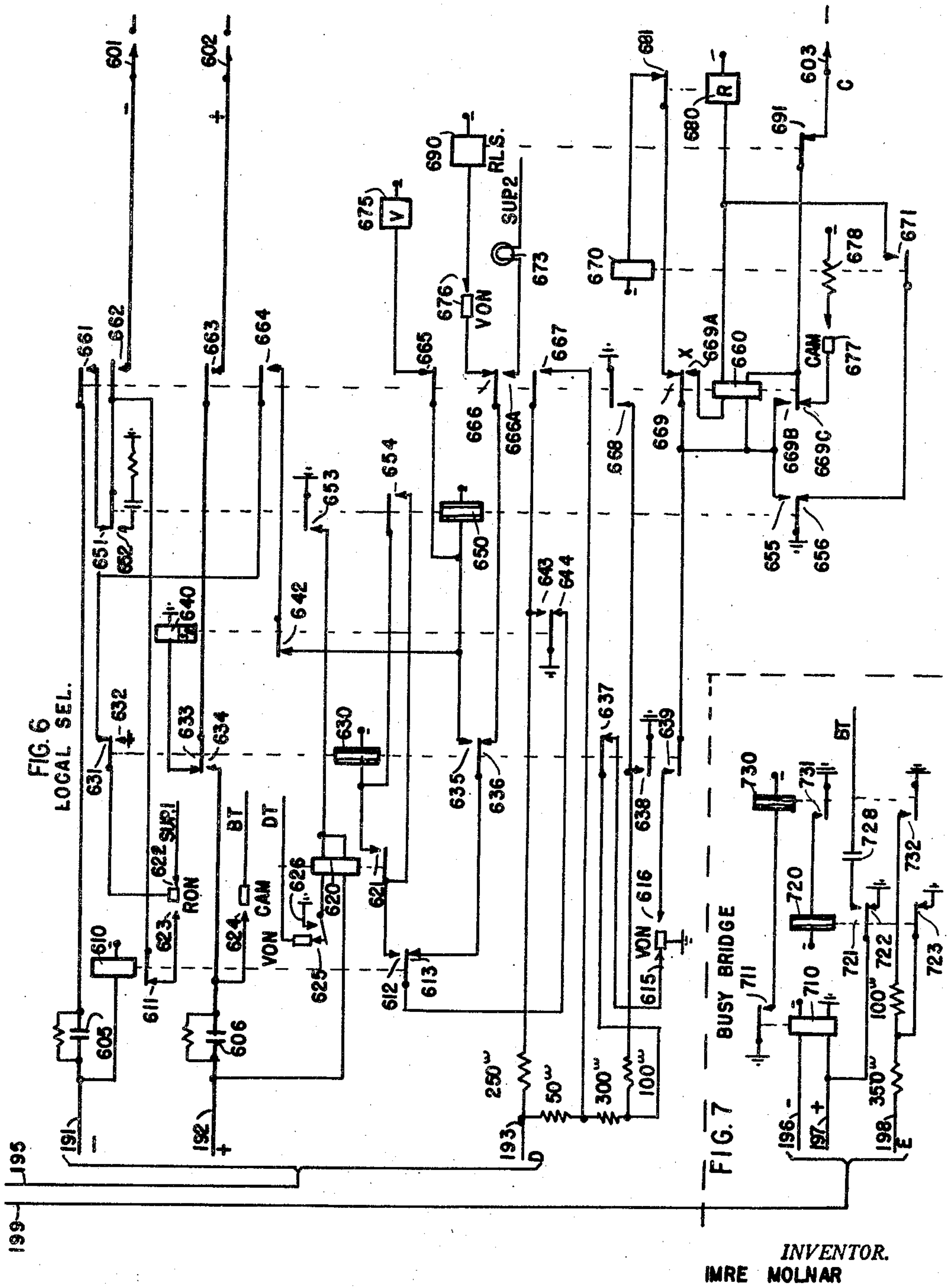

Fig. 6, which goes below Fig. 2, shows one of the branch exchange local selectors accessible to the secondary lineswitches on local calls.

Fig. 7, which is shown with Fig. 6, shows a busy bridge circuit also accessible through the banks of the secondary lineswitches on an attempted local call where all local first selectors are busy.

With further reference to the drawings, the secondary lineswitch of Fig. 1 consists essentially of six relays and a 25-point, single-motion rotary switch, having a motor magnet 165 and five wipers 171–175 shown on the right. The primary lineswitch, indicated at the upper left by the rectangle 20, is assumed to be an 11 point rotary switch individual to the line, having the usual line and test wipers 21, 22, and 23, and the usual line and cut-off relays not shown. The detail circuits of this switch and the associated subscriber's telephone, have been omitted, in order to simplify the drawing. At the lower right in Fig. 1 is an all-trunks-busy relay 186 common to a plurality of secondary lineswitches and to a plurality of repeaters. This relay is normally held operated as long as there is a free repeater in the associated repeater group.

The discriminating repeater of Figs. 2 and 3, which is accessible through a contact set in the first part of the bank arcs of the secondary lineswitch, consists primarily of 13 relays and a small auxiliary stepping switch commonly known as a minor switch, having a motor magnet 350, a release magnet 360, and a single wiper 370.

The trunk circuit of Fig. 4, which is permanently connected between the repeater of Figs. 2 and 3 and the incoming selector of Fig. 5, and is individual thereto, consists basically of only four relays and a step-up transformer 434 used for releasing the selector of Fig. 5.

The incoming first selector of Fig. 5 is a two motion Strowger selector having vertical and rotary magnets 575 and 580, a release magnet 590, wipers 501, 502 and 503, and five relays. It is arranged to respond to impulses received over the negative trunk wire from the repeater, and is equipped with a gas discharge tube 539 for controlling the release.

The local first selector of Fig. 6, which is accessible through a contact set in the middle section of the bank arcs of the secondary lineswitch, is also a two-motion Strowger selector, having vertical and rotary magnets 675 and 680, a release magnet 690, wipers 601, 602 and 603, and seven relays. It is arranged to respond to loop pulsing from the subscriber's dial, and to repeat these pulses to the succeeding local switches over the negative talking conductor.

The busy bridge circuit of Fig. 7, which is accessible through a contact set in the final portion of the bank arcs of the secondary lineswitch, consists simply of three relays, and a busy tone connection.

The operation of the circuits will best be understood by tracing the progress of both an outgoing and a local call through the circuits illustrating the invention. Since the larger part of the calls originating in a branch exchange are likely to be directed to the main exchange, and since the discriminating repeaters have been made first choice in the banks of the secondary lineswitches, an outgoing call through the repeater of Figs. 2 and 3 will be described first.

*Outgoing calls*

It will accordingly first be assumed that the subscriber S in Fig. 1 wishes to call the main exchange, and that the repeater is arranged to absorb only the first digit of the call number on local calls, which will be assumed to be the digit 2. In such case, the jumpers X and Y shown in the lower part of Fig. 2 will be employed, and in Fig. 3, the second contact of the minor switch will be cross-connected to the pumper point A, by the jumper F. The jumpers G and H will be omitted.

It should also be noted that in the idle condition of the equipment, guard relay 430 in the trunk circuit is normally held operated from the associated main exchange incoming selector over the following circuit: ground, contacts 522, 543, 553, off-normal contacts 561, positive trunk conductor 492, contacts 411, variable resistance 435, contacts 445, 422, 444, lower winding of relay 430, contacts 442, negative trunk conductor 481, upper winding of line relay 510, off-normal contacts 534, and the lower winding of relay 510 to battery. Selector line relay 510 does not operate in this circuit.

In the repeater likewise, guard relay 240 is normally held operated from the trunk circuit, from ground through the minor switch off-normal springs 246, winding of relay 240, resistor 244, contacts 205, test wire 483 to Fig. 4, through the closed make contacts 431, contacts 446, upper winding of switching relay 410, contacts 421, and the upper winding of guard relay 430 to battery. Switching relay 410 does not operate in this circuit, but relay 430 is maintained operated. Guard relay 240, at its make contacts 241 prepares a stop circuit for the secondary lineswitches, and at make contacts 242 connects a multiple ground to the previously mentioned all-trunks-busy relay 186. The relays 240 of the other idle repeaters of the group also maintain ground on wire 185 leading to relay 186, so that relay 186 will restore only when all repeaters are busy. In such case there will be no ground marking from contacts such as 187 on the associated test contacts in the banks of the primary switches, and the latter will be unable to seize a secondary switch in this group until at least one of the associated repeaters has become free again and has reoperated relay 186. It will be assumed in the following descriptions that repeaters are available, and that relay 186 is operated.

When the calling subscriber S removes his receiver, a line relay not shown, in the associated primary lineswitch 20, closes a local stepping circuit, and connects battery through a line cutoff relay not shown, to test wiper 23. As soon as a free secondary lineswitch is found, a circuit is closed from battery through the primary switch cutoff relay, test wiper 23, contacts 105, lower winding of start relay 120, and contacts 139 to ground at contacts of relay 186. The primary switch cutoff relay operates in this circuit to extend the calling line through the line wipers 21 and 22, and to disconnect the line relay from the talking circuit, in known manner. Start relay 120 also operates, and at contacts 122 lights busy lamp 159, through contacts 133 and 153. Relay 120 also, at contacts 123 connects test relay 110 to test wire 15, and at contacts 124 operates interrupter relay 160, via contacts 107, 112, 166, 143. Relay 160 in turn operates motor magnet 165 from the same ground, through contacts 161. Motor magnet 165, at contacts 166 opens the circuit to relay 160, which restores and releases the motor magnet. The motor magnet upon releasing advances the wipers 171–175 one step, and re-operates relay 160. This continues until a free repeater is found, which is indicated by ground through 350 ohms on the corresponding test conductor 183, whereas a busy repeater is indicated by ground through 450 ohms, or no ground, on wire 183. Test relay 110 is adjusted to operate from ground through 350 ohms, but not through 450 ohms.

When a free repeater is found, tests relay 110 operates from test wiper 173 over the following circuit: ground through contacts 241 of the repeater guard relay, upper 200 ohm winding of relay 230, 100 ohm resistor, 50 ohm resistor, contacts 202, wire 183, wiper 173, contacts 138, relay 110, contacts 123, dry disc rectifier 114, resistor 113, test wire 15 and wiper 23 to battery at the primary switch. Relay 230 will not operate in this circuit, since there is not enough power in its upper winding to operate through the resistances involved.

Test relay 110 upon operating, at its contacts 112 opens the circuit to interrupter relay 160 and magnet 165 to prevent their re-operation, and at contacts 111 extends ground from contacts 124 to switching relay 100, as well as to the upper winding of start relay 120 through contacts 135. Relay 120 is accordingly maintained operated independently of its lower winding. Switching relay 100 operates, and at contacts 101 and 102 extends the calling line loop to the selected repeater. Relay 100 also, at contacts 103 connects kickoff relay 130 to wiper 174, at contacts 104 shunts out contacts 123, rectifier 114 and resistor 113, at contacts 105 disconnects the lower winding of start relay 120, at contacts 106 connects an alternate ground to itself and the upper winding of relay 120, and at contacts 107 opens another point in the circuit to interrupter relay 160 and magnet 165.

Upon the extension of the calling line loop to the repeater, line relays 220 and 258 of the repeater are operated in series as follows: battery through relay 220, negative talking conductor 181, wiper 171, contacts 101, wiper 21, line wire 1, calling telephone, line wire 2, wiper 22, contacts 102, wiper 172, positive talking conductor 182, both windings of relay 258 in series, wire 281, contacts 324, wire 280, and break contacts 261 to superimposed ground on the dial tone wire DT. Dial tone is also passed back to the calling party from the dial tone wire DT, over the same circuit. Relay 258 lights supervisory lamp 355 from ground through contacts 259 and 337. Relays 220 and 258 together operate hold relay 300 as follows: battery through relay 300, wire 275, contacts 259, 221, 201, and wire 282 to ground at contacts 343.

Hold relay 300 upon operating, at contacts 301 prepares an outward pulsing circuit over the negative talking wire 481, at contacts 303 prepares a pulsing circuit to the minor switch motor magnet, at contacts 304 closes a point in the positive talking wire, and at contacts 306 closes a circuit to the lower winding of seizure relay 230, which now operates. Relay 230 thereupon, at contacts 231 connects ground through 450 ohms to test wire 183 to mark this repeater busy to the other secondary switches, at contacts 232 connects timing wire P1 to timing relay 210, at contacts 233 prepares a number of locking circuits, at contacts 234 and 236 prepares the discriminating circuits, and at contacts 237 connects shunting ground to guard relay 240, thereby causing the latter to restore and open its contacts 241 and 242.

The closure of contacts 237, in addition to shunting down guard relay 240, also completes a direct ground circuit to the upper windings of trunk relays 410 and 430 in series over test wire 483, superseding the original ground through relay 240 and resistor 244. Switching relay 410 now operates, while guard relay 430 holds. Relay 410 accordingly, at contacts 411 opens the circuit through the lower winding of guard relay 430 and the distant line relay 510, at contacts 412 extends the positive talking wire 482 through to the trunk, and at contacts 415 lights supervisory lamp 418. The circuits are now ready for pulsing.

The calling subscriber, upon hearing the dial tone, proceeds to dial the number of the wanted party in the main exchange, the first digit of which will be assumed to be 3. In response to this digit, the repeater line relays 220 and 258 will release and re-operate quickly three times. Relay 220 at each release, at contacts 221 opens the circuit of release relay 300 momentarily, but the latter being slow to release remains operated. Relay 220 also at each release, at contacts 222 passes a pulse to the distant incoming selector in Fig. 5 over the negative talking wire, and at contacts 223 passes a pulse to transfer relay 310 and the minor switch motor magnet 350 in parallel.

The pulsing circuit to the distant incoming selector is as follows: ground through contacts 343, 201, 222, 301, negative talking wire 481 to Fig. 5, upper winding of relay 510, vertical off-normal contacts 534, and the lower winding of relay 510 to negative battery. Line relay 510 thus operates on each release of relay 220, and releases on each re-operation of relay 220. The first operation of relay 510 passes a pulse via contacts 511, 525 and 545 to vertical magnet 575 and transfer relay 520 in parallel. Relay 520 operates quickly, and at contacts 524 connects itself and magnet 575 directly to pulsing contacts 511. Relay 520 also, at contacts 521 shunts contacts 534 to maintain the circuit to relay 510, and at contacts 523 operates relays 530 and 540 in series, whereupon these latter two relays lock up to contacts 532. Vertical magnet 575 pulses three times in response to the pulses from contacts 511, and raises wipers 501—503 to the third level. Transfer relay 520 being slow to release remains operated during the pulsing, but restores shortly after the last pulse. In response to the first vertical step of the wipers, the off-normal contacts 534 and 561 open, while contacts 535 and 562 close. Contacts 562 prepare the release circuit, contacts 534 open the original circuit to line relay 510, and contacts 535 prepare the re-use of relay 510 as a rotary interrupter relay.

Transfer relay 520 restores following the last impulse, after a short delay, and at contacts 521 disconnects trunk wire 481 from the lower winding of relay 510. Relay 520 also, at contacts 525 prepares a circuit to the rotary magnet, and at contacts 522 closes a circuit to the lower winding of line relay 510 as follows: ground, contacts 522, 542, 554, 581, 533, and off-normal contacts 535 to relay 510 and battery. Relay 510 is thereby re-operated and at contacts 511 operates rotary magnet 580 via contacts 525 and 544. Rotary magnet 580 steps the wipers 501, 502, 503 one step into the third level of bank contacts, and at its contacts 581, opens the circuit to line relay 510. Relay 510 accordingly restores, and releases the rotary magnet, which re-operates relay 510. This action continues until the selector finds a free second selector or other succeeding switch not shown. When this occurs, test wiper 503 will find negative battery on the corresponding test contact in the bank, and will operate switch-through relay 550 over its lower winding. Relay 550 on operating, at contacts 554 opens the circuit to relay 510 to prevent its reoperation and thus stop the stepping, and at contacts 555 locks in series with magnet 580 from ground through contacts 522 and 542. Magnet 580 will not operate in this circuit. Relay 550 also at contacts 553 opens a point in the release circuit now also open at contacts 543, and at contacts 551, 552 extends the trunk conductors to the next switch.

Returning now to the repeater, the pulsing circuit to the minor switch motor magnet 350 is as follows: ground through contacts 343, 201, 223, 303, winding of transfer relay 310 to battery, and contacts 321 to magnet 350 and battery. The motor magnet operates and releases three times in response to the pulses, and steps wiper 370 to the third contact in the bank. Upon the first step, off-normal contacts 246 open and off-normal contacts 245 and 243 close. Transfer relay 310 also operates on the first pulse, and releases after the third pulse. Relay 310 upon operating, at contacts 311 disconnects the negative wire 481 from the calling line, at contacts 312 connects a spark quenching condenser 315 to wire 481, and at contacts 313 operates auxiliary transfer relay 330, from ground at contacts 233. Relay 330, at contacts 331 shunts contacts 259 to make relay 300 independent of these contacts temporarily, at contacts 332 shunts the lower winding of line relay 258 to improve the pulsing over the line loop, at contacts 333 connects an additional ground to seizure relay 230 temporarily, and at contacts 338 prepares circuits to discriminating relay 320.

Transfer relay 310, upon releasing after the last pulse, opens the circuit to relay 330. The latter however, being also slow to release, remains operated for a further interval. During this interval, break contacts 314 of hold relay 310 close a circuit to relays 320 and 260 in parallel as follows: ground through off-normal contacts 245 and jumper X, contacts 236, 314, 338 and the upper winding of relay 320 to battery; and from contacts 314 also through contacts 327, 257, 234, off-normal contacts 243, contacts 269, the upper winding of relay 260 to direct battery, and also through the lower winding of relay 260 and contacts 265 and 253 to battery through resistor 247.

Digit-counting relay 260 will not operate in this circuit, as its windings are now energized in opposition, although this energization is unbalanced, due to the effect of the resistor 247 in series with one winding. Discriminating relay 320 does operate however, in response to the energization of its upper winding, and at contacts 328, locks direct to the ground on wire 295. Relay 320 also, at contacts 321 opens the pulsing circuit to motor magnet 350, at contacts 322 prepares a special circuit to relay 310, at contacts 323 completes the extension of the positive talking wire to the trunk, at contacts 324 disconnects dial tone, at contacts 325 connects a substitute ground to line relay 258, at contacts 326 disconnects timing relay 210, and at contacts 327 opens the original circuit to relay 260.

Responsive to the opening of the circuit of digit counting relay 260, a momentary inductive "kick" is generated in the windings of this relay. Due to the unbalanced condition of the two windings, this kick has enough power to cause one winding to overpower the other sufficiently to operate the relay. Relay 260 thereupon, at its preliminary make contacts 267 connects its windings in series to ground at contacts 233. The two windings are thereby energized in series aiding, thus providing ample power. Relay 260 at its other contacts prepares circuits for the receipt of the second digit, which circuits are not required however, in the present case. Auxiliary transfer relay 330 releases, shortly after the operation of relays 260 and 320, but this is without special effect at this time.

The remaining digits of the call number again pulse line relays 220 and 258, and pulsing contacts 222 repeat these pulses as before over the negative trunk wire to the distance switch train, which completes the connection, and rings the called party. Relays 310 and 330 operate from pulsing contacts 223 in response to the first pulse of each digit, and release after the last pulse of each digit, but the minor switch motor magnet 350 is not affected, due to the open contacts 321 of the discriminating relay 320. The counting relays are likewise unaffected due to the open contacts 327, but the pulsing circuits are improved, in the manner explained with respect to the first digit.

Upon completion of the conversation, both parties hang up. When the calling party hangs up, repeater line relays 220 and 258 restore, and contacts 223 cause the reoperation of relays 310 and 330. Hold relay 300 restores after an interval, following the opening of contacts 221. Relay 300 thereupon, at contacts 302 connects transfer relay 310 momentarily to the negative trunk wire, at contacts 303 opens the original circuit to relay 310, at contacts 305 connects meter relay 340 to the positive trunk wire, and at contacts 306 removes one of the grounds from the lower winding of seizure relay 230.

Negative battery placed on the positive side of the trunk by the main exchange connector responsive to the release of the back bridge relay thereof, now operates meter relay 340, via contacts 552, 412, 323 and 305. Meter relay 340 thereupon, at contacts 341 disconnects transfer relay 310 from the negative trunk wire, at contacts 344 shunts guard relay 240 to prevent its premature re-operation, and at contacts 342 connects ground by way of wires 284 and 285 and contacts 334, through the 50 ohm and 250 ohm resistors in parallel, to test wire 183, and thence through wiper 173 of the secondary switch, contacts 138, relay 110, contacts 104, wiper 23 of the primary switch, and to a call meter, not shown, individual to the calling line. This meter thereupon operates from the increased current, and records the completed call .

Transfer relay 310 also restores, after a slight delay, following the release of hold relay 300, and releases auxiliary transfer relay 330, after a further slight delay. Relay 330 in turn, at contacts 335 prepares a circuit for release magnet 360, at contacts 334 removes the 50 ohm ground from test wire 183, thereby releasing the call meter, and at contacts 333 removes the last ground from seizure relay 230.

Seizure relay 230 now restores, and at contacts 237 removes ground from test wire 483 and from the upper windings of trunk relays 410 and 430. The slow switching relay 410 holds momentarily, but guard relay 430 releases quickly, and at contacts 431 removes the battery through its upper winding from test conductor 483, to prevent reoperation of repeater guard relay 240 at this time. Seizure relay 230 also, at contacts 236 unlocks and releases discriminating relay 320, at contacts 235 completes the circuit to release magnet 360 via off-normal contacts 243 and contacts 335, at contacts 233 unlocks and releases digit-counting relay 260, at contacts 232 disconnects timer wire P1, and at contacts 231 removes the 450 ohm ground from test wire 183.

The minor switch is restored to normal in response to the energization of release magnet 360, and off-normal contacts 243 and 245 open, and contacts 246 close. This is without effect at the moment except that contacts 243 open the release circuit when the switch has fully restored. The release of digit-counting relay 260 is without special effect, but the release of discriminating relay 320 opens the circuit of meter relay 340 at contacts 323, and relay 340 accordingly restores, after a slight delay.

Primary lineswitch 20 now releases, responsive to the removal of ground from wire 183, disconnects battery from its test wiper 23, and re-connects the line relay to the subscriber's line. In the secondary lineswitch, test relay 110 also restores, and at contacts 111 opens the circuit to switching relay 100 and start relay 120, which restore after a slight delay. Relay 100 thereupon, at contacts 101, 102 further opens the talking circuit, and at contacts 104 prepares the disconnection of test relay 110 from test wire 15. Relay 120 upon releasing, at contacts 124 disconnects starting ground, and at contacts 123 completes the disconnection of test relay 110 and of rectifier 114. Both lineswitches are now again in normal condition, but the repeater is still marked busy, since there is now no ground on its test wire 183.

The purpose of the rectifier 114 in the test circuit is to prevent the possible lockup of two secondary lineswitches, due to the fact that relay 120 is made to release more slowly than relay 100, so that the latter will always release first. Should another secondary switch be hunting while this switch is releasing, and should the hunting switch pick up the test wiper of the releasing switch at the moment when relay 100 of the latter was released and relay 120 not yet released, were the rectifiers not provided, the two test relays 110 would operate in series. The circuit for this operation would be as follows: ground at relay 186 of the releasing switch, contacts 139, lower winding of relay 120, contacts 105, resistor 113, contacts 123, winding of test relay 110, contacts 138, test wiper 173 of the releasing switch, test wiper 173 of the hunting switch, contacts 138 thereof, winding of its test relay 110, contacts 123, and resistor 113 to battery at the primary lineswitch of the other calling line. The hunting switch would be stopped by the operation of its test relay, and the re-operation of the test relay of the releasing switch would hold relay 120 and re-operate relay 100. It will be obvious that such a lockup is prevented by the presence of rectifier 114 in the releasing switch which prevents the flow of current over the test circuit in the wrong direction.

Meanwhile, in the trunk circuit, the release of guard relay 430, in addition to removing battery from test wire 483 at contacts 431, also at contacts 432 closes a circuit through the lower windings of relays 410 and 420. Transformer relay 420 operates in this circuit and at contacts 429 locks direct to contacts 432, and shunts the lower winding of relay 410, which releases after a short delay period. Relay 420 also, at contacts 428 prepares a circuit to timing relay 440, at contacts 427 prepares a new lamp circuit, at contacts 426 grounds start wire ST leading to a timing interrupter not shown, at contacts 424 connects the secondary winding of the step-up transformer 434 to the positive trunk wire 492, and at contacts 425 closes a circuit to the primary winding of transformer 434, from ground at contacts 413. A a high potential is thereby induced into the secondary winding of transformer 434, and is transmitted via contacts 424 and 412 to wire 492 and thence through contacts 541 and the non-inductive resistance 538 in parallel with condenser 537 to the gas tube 539. The tube 539 is thereby rendered conductive in known manner, and completes a direct current circuit from ground through the tube to the upper winding of the release control relay 530, and thence through contacts 531, 412 and 424 to battery through the secondary winding of transformer 434. As the current in this circuit is in opposition to that in the lower winding of relay 530, this relay is caused to release.

Release control relay 530 upon releasing, at its contacts 531 opens the circuit through its upper winding, and at contacts 532 opens the circuit through its lower winding and both windings of release relay 540. Release relay 540 accordingly releases, and at contacts 541 disconnects and extinguishes tube 539. Relay 540 also, at contacts 546 removes ground from test wiper 503, at contacts 543 prepares the release circuit, and at contacts 542 opens the locking circuit of switch-through relay 550, which restores. Relay 550 in turn at contacts 551, 552 disconnects line wipers 501 and 502, and at contacts 553 closes a circuit to release magnet 590 from ground through contacts 522, 543, 553 and 562. The incoming selector accordingly releases and returns its wipers to their normal position in known manner. Off-normal contacts 534 and 561 thereupon close, and off-normal contacts 535 and 562 open. Release magnet 590 then restores. The remaining switches of the main exchange end of the connection also restore, in response to the removal of ground from test wiper 503.

In the trunk circuit, when switching relay 410 releases, after its delay period, contacts 415, 414 thereof cause lamp 418 to burn dimly instead of brightly, while contacts 412 disconnect trunk wire 492 from the secondary of the transformer, and contacts 413 open the circuit to the transformer primary. Relay 410 also at contacts 411 completes a circuit for the re-operation of guard relay 430 as follows: battery through the upper winding of relay 430, contacts 423, 445, 411, positive trunk wire 492, off-normal contacts 561 which close when the incoming selector releases, and thence through contacts 553, 543 and 522 to ground. Guard relay 430 upon re-operating over this circuit, at contacts 431 closes a point in the circuit to repeater guard relay 240, and at contacts 432 unlocks and releases transformer relay 420. Relay 420 upon releasing, at contacts 428 disconnects timing relay 440, at contacts 427 extinguishes lamp 418, at contacts 426 removes its ground from the interrupter start wire, at contacts 425, 424 completes the disconnection of transformer 434, and at contacts 422 completes the original circuit to the lower winding of guard relay 430 from battery through the distant line relay 510 through contacts 534, 442, 444, 422, 445, 411, 561, 553, 543, and 522 to ground. Relay 510 will not operate in this circuit, as previously indicated, but relay 430 operates.

The release of transformer relay 420 finally, at contacts 421 re-closes the original circuit to the repeater guard relay 240, from battery through the upper winding of trunk guard relay 430, contacts 421, the upper winding of switching relay 410 which remains normal, contacts 446, 431, test wire 483, contacts 205, and the winding of relay 240 to ground at off-normal contacts 246. Guard relay 240 now operates, at contacts 242 re-connects ground from this repeater to the all-trucks-busy relay 186, and at contacts 241 re-connects ground through 340 ohms including the upper winding of seizure relay 230 to test wire 183. The repeater is thereby marked free to the secondary lineswitches, and is therefor again available for another call.

If for any reason, the incoming selector at the main exchange failed to release in response to the high voltage release pulse transmitted from the trunk circuit at the branch exchange the repeater would be held, and the release pulse would be repeated in the following manner. Due to the non-release of the selector, off-normal contacts 561 thereof remain open, and there is thus no circuit for the upper winding of guard relay 430 as before from ground at selector contacts 522 over the positive trunk wire 492 and contacts 411, 445, 423. Relay 430 therefore does not re-operate and transformer relay 420 remains locked to contacts 432. Switching relay 410 releases however, as before. Shortly thereafter the timing interrupter, not shown, connects a pickup ground pulse to the PU wire, which causes timing relay 440 to operate and lock through contacts 449 to ground from the interrupter on hold wire H. Relay 440 thereupon at contacts 448 connects another ground to the interrupter start wire ST, at contacts 447 connects up the interrupter pulse wire P4, at contacts 446 opens another point in the circuit to test wire 483, and at contacts 441 and 443 prepares a circuit for the lower winding of guard relay 430 from the interrupter pulse wire P3.

Shortly thereafter, the interrupter grounds pulse wire P3 and energizes the lower winding of guard relay 430 via contacts 443 and 441. Relay 430 then re-operates, and at contacts 432 unlocks and releases transformer relay 420. A ground from the interrupter next appears on wire P4, which energizes the upper windings of relays 410 and 430 in series. Relay 410 accordingly re-operates, at contacts 415 causes lamp 418 to flash bright again, and at contacts 413 prepares the transformer primary circuit. The interrupter next removes ground from the P3, P4, H and PU leads, thereby de-energizing relays 410, 430 and 440. Relays 430 and 440 release immediately, but relay 410 holds momentarily, due to being slow to release. The release of guard relay 430 at the same time re-closes the circuit through the lower windings of relays 410 and 420, from contacts 432, thereby holding relay 410 and re-operating relay 420. Relay 420 thereupon transmits a second high voltage release pulse to the incoming selector over the positive side of the trunk as before, and shunts the lower winding of relay 410 which restores after the usual delay. This action will be repeated if necessary until the distant switch releases, or until an attendant, noting the flashing of the lamp 418, causes the equipment to be released manually, and the trouble cleared as required.

In the case of an incompleted call, where there has been no answer by the called subscriber, the release will be similar to that described, except that the call will not be recorded. Since the distant connector will not have switched through, there will be no battery returned over the positive side of the trunk to operate meter relay 340. Consequently there will be no meter operation and the repeater will be made available for a new call slightly sooner than would otherwise be the case.

This repeater is also arranged to block the release of the connection until the called main exchange subscriber hangs up, in order to permit the tracing of nuisance calls. Under such conditions, the called party does not hang up, but remains on the connection after the calling party has hung up. The connector accordingly returns ground over the negative talking conductor. When therefore the calling branch exchange subscriber hangs up, line relays 220 and 258 release and cause the operation of transfer relays 310 and 330 as for a normal release. Hold relay 300 also restores after its delay period, in the usual way, but at its back contacts 302 it now completes a holding circuit for transfer relay 310 from the ground on the negative talking conductor via contacts 341 and 322.

Transfer relay 310 accordingly remains operated instead of releasing after a short delay as in a normal release, and maintains relay 330 also operated. Relay 330 in turn holds seizure relay 230 independently of hold relay 300, and relay 230 maintains the lock on relays 260 and 320. Auxiliary relay 330 accordingly holds battery through the individual supervisory lamp 355 on the supervisory SUP2 wire leading to alarm equipment not shown. Lamp 355 is thereby lighted at reduced brilliancy, and the alarm equipment is operated over the same circuit, to alert an attendant who then comes in on the connection, as by plugging a headset into a trunk test jack not shown, and talks to the called subscriber. If the called party wants the call traced, the attendant proceeds to comply. The call is released and recorded in the usual way when the called party hangs up, unless means is provided for the attendant to hold the connection.

*Locals calls*

It will now be asssumed that the subscriber S in Fig. 1 wishes to call another local subscriber in the branch exchange, and that the repeater is arranged as before for discrimination on the first digit, which is assumed to be 2 for local calls. Jumpers X, Y and F will be provided in the repeater, as previously described.

When the calling subscriber S removes his receiver to initiate the call, the primary lineswitch 20 seizes a secondary lineswitch as before, and causes the operation of start relay 120 therein over its lower winding as before, over test wire 15. Relay 120 thereupon operates interrupter relay 160 as before, and the latter operates motor magnet 165. The secondary switch accordingly advances its wipers until a free repeater is found, when test relay 110 operates to stop the stepping, from ground through contacts 241 of the normally operated guard relay 240 of the seized repeater, through the upper winding of seizure relay 230, test wiper 173, relay 110 and contacts 123 to battery at the primary lineswitch. Relay 110 thereupon opens the stepping circuit as before at contacts 112, and at contacts 111 closes a holding circuit to start relay 120, and an operating circuit to switching relay 100. The latter relay accordingly operates, extends the calling line loop at its contacts 101, 102, and at its contacts 103 connects kickoff relay 130 to test wiper 174, precisely as described for an outgoing call.

In the repeater, line relays 220 and 258 now operate in series over the calling line loop, from battery through relay 220, and ground through relay 258 from dial tone wire DT in Fig. 2 via contacts 261 and 324, and dial tone is passed back over the line. Hold relay 300 then operates via contacts 259, 221, 201, 343, and in turn operates seizure relay 230 from contacts 306. Seizure relay 230 thereupon, at contacts 231 connects ground through 450 ohms to test wire 183 to mark this repeater busy to the other secondary switches, and at contacts 237 connects direct ground to test wire 483 leading to the trunk circuit. This direct ground shunts and releases repeater guard relay 240, and causes the operation of the trunk switching relay 410 in series with the upper winding of the normally operated trunk guard relay 430. Relay 410 thereupon, at contacts 411 disconnects the lower winding of guard relay 430, which is normally energized by ground and battery from the distant associated incoming selector in the main exchange, as previously described.

The calling party now proceeds to dial the first digit "2" of the wanted local party in the branch exchange, and the repeater line relays 220 and 258 release and reoperate twice in response. Line relay 220 at each release, at contacts 222 passes an impulse of current to the line relay 510 of the distant incoming selector in the main exchange, over the negative trunk wire, from ground through contacts 343, and at contacts 223 passes a similar impulse from the same source of ground to transfer relay 310 and motor magnet 350 in the repeater, in parallel.

Line relay 510 in the distant incoming selector, operates and releases twice, in response to the impulses on the negative trunk wire, and at its make contacts 511 passes two impulses to vertical magnet 575. Vertical magnet 575 pulses twice in response and raises the switch wipers 501—503 to the second level. The off-normal contacts 534, 535, 561, 562 change position on the first step, while transfer relay 520 operates on the first pulse and releases after the last pulse, with relays 530 and 540 operating in series from contacts 523, and locking in series from contacts 532. Upon the release of transfer relay 520 line relay 510 is reoperated via contacts 522, 542, 554, 581, 533, 535. Relay 510 then operates rotary magnet 580, which steps the wipers into the bank on the second level, and at the same time releases relay 510. This action continues until test wiper 503 finds an idle succeeding switch, when switching relay 550 will operate and lock to stop the automatic rotary stepping, and extends the call to the selected succeeding switch.

In the repeater, motor magnet 350 also operates and releases twice in response to the pulses, and steps wiper 370 onto the second bank contact. Off-normal contacts 243, 245 and 246 change position on the first step, while transfer relays 310 and 330 operate on the first pulse and release slowly in succession, after the last pulse, as before. During the interval between the release of these two relays, with relay 310 released and relay 330 still operated, circuits are now closed to both windings of discriminating relay 320, instead of only to one winding as for an outgoing call. The circuit for the two windings of relay 320 is from ground through resistor X and off-normal contacts 245, contacts 236, 314 and 338 to the upper winding of relay 320, and from contacts 338 through wiper 370 and the second bank contact and jumper F to terminal A, and thence through contacts 262 and 251 to the lower winding of relay 320. A branch of this circuit also extends from contacts 314 through contacts 327, 257, 234, 243 and 269 to the two windings of digit counting relay 260 in parallel. The windings of both relays are energized in opposition however, and neither relay operates. The release of auxiliary transfer relay 330 now occurs, and this relay at contacts 338 disconnects ground from both windings of relay 320 which remains at rest. Relay 330 at the same time completes a circuit for release magnet 360 via contacts 335, 243, 234, 257, 327, 314 and 236, to ground through contacts 245 and jumper X.

The minor switch now releases, restoring wiper 370 to its normal position. When the switch is completely restored, the off-normal contacts also resume their normal position, and off-normal contacts 243 thereupon open the circuit to the release magnet. Contacts 243 at the same time open the circuit to the unbalanced digit-counting relay 260, which operates from the resulting inductive kick, in the manner previously described for outgoing calls, and locks with both windings in series to ground at contacts 233. Relay 260 thereupon, at contacts 261 disconnects the dial tone, and at contacts 269A closes a circuit to kickoff relays 200 and 130 in series as follows: ground through jumper X, contacts 236, 314, 327, 269A, jumper Y, contacts 204 and 215, lower winding of relay 200, test wiper 174, contacts 155, 136, 103, resistor 125, and the winding of relay 130 to battery.

Kickoff relay 200 operates over this circuit, and at preliminary make contacts 203 locks to ground at contacts 233. Relay 200 also, at contacts 201 disconnects the pulsing circuit, at contacts 202 removes all grounds from this repeater from test wire 183, at contacts 204 opens its original operating circuit, and at contacts 205 removes all grounds from test wire 483. In the trunk circuit, guard relay 430 restores responsive to the removal of ground from test wire 483 and operates relay 420 which sends the usual high voltage pulse over the positive trunk conductor 492 to release the main exchange incoming selector in the same manner already described for an outgoing call.

In the secondary lineswitch, kickoff relay 130 also operates in series with kickoff relay 200, and at preliminary make contacts 141 locks to ground at contacts 124. Kickoff relay 130 also at contacts 131 connects supervisory relay 150 momentarily to the positive talking wire, but this is without effect as relay 150 will not operate in series with repeater line relay 258. Relay 130 further, at contacts 134 connects ground through resistor 109 to test wire 15 to hold the primary switch and shunt test relay 110, at contacts 135 disconnects the upper winding of start relay 120, at contacts 136 opens its original operating circuit, at contacts 137, 138 transfers test relay 110 from test wiper 173 to test wiper 174, at contacts 139, 140 prepares a new circuit for the lower winding of start relay 120, and at contacts 142, 143 disconnects interrupter relay 160, and prepares a self interrupting circuit for motor magnet 165.

Test relay 110 releases quickly, in response to the shunting and opening of its circuit, at contacts 112 closes a point in the stepping circuit, and at contacts 111 disconnects switching relay 100 and opens another point in the circuit to the upper winding of start relay 120. While the circuits of relays 100 and 120 are both opened at approximately the same time, start relay 120 is considerably slower to release than is relay 100, so that switching relay 100 releases first. Relay 100 accordingly at its contacts 101, 102 opens the circuit to the line wipers 171 and 172 and to the repeater line relays 220 and 258. Switching relay 100 also opens contacts 103 without effect, opens contacts 104 to prepare the re-operation of test relay 110 through rectifier 114, at contacts 105 closes a new circuit to the lower winding of start relay 120 in time to prevent the release of this relay, and at contacts 107 completes the high speed stepping circuit.

In the repeater, line relays 220 and 258 release, in response to the opening of contacts 101 and 102 in the secondary lineswitch circuit, and further open the circuit of hold relay 300, previously opened at break contacts 201 of the repeater kickoff relay 200. Also, because of the open break contacts 201, the closure of break contacts 222, 223 of line relay 200 does not cause any momentary operation of transfer relays 310 and 330 as in the release of an outgoing call, previously described, and these relays consequently remain normal. Hold relay 300 therefore, upon releasing after the usual short delay, releases seizure relay 230 directly, and the latter at contacts 233 unlocks and releases relays 200 and 260. If the trunk circuit and switch of Figs. 4 and 5 are now again at normal, repeater guard relay 240 reoperates, by way of contacts 205 and test wire 483. Guard relay 240 thereupon at contacts 241 again connects 350 ohm ground to test wire 383 to mark this repeater free to the other secondary lineswitches. Test relay 110 of the secondary switch handling the call is not affected by this new ground should this switch still be on the associated bank contact, nor by a similar ground from any other repeater should the secondary switch be hunting, because of the open contacts 138, which keep wiper 173 of this switch disconnected from relay 110.

In the secondary switch, the new circuit for the lower winding of start relay 120, which was closed by the release of switching relay 100, is from ground through contacts 124 and 141, resistor 125, contacts 140, lower winding of relay 120, contacts 105, and test wire 15 to battery at the primary switch. Start relay 120 is accordingly maintained operated. At the same time, the closure of contacts 107 of the switching relay operates motor magnet 165, from ground through contacts 124, 107, 112, 166, and 142. The motor magnet 165 upon the completion of its stroke opens its own circuit at contacts 166. Magnet 165 accordingly releases and advances the wipers 171—175 one step. Contacts 166 immediately reclose the circuit and magnet 165 continues to operate and release on a self interrupted basis at high speed. Because of the open wiper 173 the wipers 171—175 speed quickly past the remaining repeater contact sets in the bank, and enter upon the second portion of the bank arcs, in search of an idle local selector, which like the repeaters, will be marked with a 350 ohm ground on the corresponding test wire 193.

Assuming that the local selector shown in Fig. 6 is the first free selector encountered by the wipers, as soon as the test wiper 174 meets the corresponding bank terminal connected to the associated test wire 193, test relay 110 is reoperated over the following circuit: ground through off-normal contacts 615, contacts 637, through 300 ohm and 50 ohm resistors in series, test wire 193, test wiper 174, contacts 155 and 137, relay 110, contacts 123, rectifier 114, resistor 113, and test wire 15 to battery at the primary switch. Test relay 110 thereupon, at contacts 112 opens the stepping circuit, and at contacts 111 reoperates switching relay 100. Switching relay 100 in turn, at contacts 107 opens another point in the stepping circuit, at contacts 106 connects a multiple ground to itself and relay 130, at contacts 105 again disconnects the lower winding of start relay 120, at contacts 104 again shunts contacts 123 and the rectifier and resistance 114 and 113, closes contacts 103 without effect, and at contacts 101 and 102 extends the calling line loop through line wipers 171, 172 to the seized selector. Start relay 120 now having both windings open at contacts 105 and 135, releases after a short delay period, and opens contacts 121, 122, 123 and 124.

In the local first selector of Fig. 6, the extension of the calling line loop, responsive to the reoperation of switching relay 100, causes the selector line relays 610 and 620 to operate in series from superimposed ground on the dial tone lead DT through vertical off-normal contacts 625, both windings of line relay 620, positive talking wire 192, cable 195, wiper 172, contacts 102, wiper 22, the calling line, wiper 21, contacts 101, wiper 171, negative talking wire 191 in cable 195, and the winding of line relay 610 to battery. At the same time the calling subscriber receives a second dial tone over this same circuit. Release relay 630 also operates, in response to the operation of the line relays, from ground through contacts 644, 612 and 621. Relay 630 thereupon at contacts 632 prepares a pulse forwarding circuit, at contacts 634 closes a point in the positive talking circuit, at contacts 635 prepares the selector vertical pulsing circuit, at contacts 637, 638 replace the 350 ohm ground on test wire 193 with ground through 450 ohms to mark this selector busy to the other secondary switches, and at contacts 639 closes a point in the circuit to interrupter relay 670.

The calling subscriber, on hearing the second dial tone, knows he has seized a local first selector, and proceeds to dial the remaining digits of the number. Assuming the second digit to be 5, the line relays 610 and 620 will release and reoperate five times in response to this digit. On each release of line relay 610, contacts 611 thereof close without effect, but contacts 613 pass an impulse of current to transfer relay 650 and vertical magnet 675 in parallel, from ground through contacts 644, 613, 635 and 665. Vertical magnet 675 accordingly operates and releases five times, and raises the wipers 601, 602, 603 to the fifth level. Release relay 630 holds during the pulsing, and transfer relay 650 operates on the first pulse, and releases after the last pulse. Relay 650 upon operating, opens contacts 651 and closes contacts 652 without effect, at contacts 653 shunts out one winding of line relay 620 to improve the line pulsing circuit, at contacts 654 shunts contacts 621 to shorten the open time of release relay 630, and at contacts 655 closes a circuit via contacts 669 and 681 to interrupter relay 670 which operates. The vertical off-normal contacts also change position on the first vertical step, whereupon contacts 615 open another point in the low resistance test circuit, contacts 616 close a second circuit to interrupter relay 670 via contacts 639, contacts 625 disconnect dial tone, contacts 626 connect another source of ground to the upper winding of line relay 620, and contacts 676 close a point in the release circuit.

When transfer relay 650 restores, after the last impulse, it closes a circuit through contacts 656 and 671 to rotary magnet 680, which operates and rotates wipers 601—603 one step into the selected fifth level of bank contacts. Rotary magnet 680 also, at contacts 681 opens the circuit to interrupter relay 670 which thereupon releases and in turn opens the circuit to magnet 680 which likewise releases. If the first switch connected to the fifth level is busy, its test terminal will be marked with ground or no potential. Interrupter relay 670 will accordingly reoperate and the foregoing action will be repeated. If all of the succeeding rank of switches accessible through the fifth level of bank contacts are busy, the wipers will rotate off the bank and on the eleventh step, cam contacts 624 and 677 will close. Cam contacts 624 connect busy tone to wire 192 and the calling line, and cam contacts 677 close a circuit for the lower winding of switching relay 660, from ground through contacts 616, 639 to battery through contacts 669C, 677, and resistor 678. Relay 660 operates in this circuit, and at preliminary make contacts 669A locks through its upper winding to the same ground at contacts 616, in series with rotary magnet 680 which will not reoperate in this circuit. Relay 660 at the same time, at contacts 669 disconnects interrupter relay 670 to prevent its reoperation. Since the wipers 601—603 are now off the bank, the call cannot proceed, and the calling party on hearing the busy tone, must hang up and try again later.

Assuming idle switches are available however in the next rank of switches, which will be indicated by a negative battery potential on its test contact, as soon as test wiper 603 finds this battery marking, switching relay 660 is operated thereby over its lower winding to ground at vertical off-normal contacts 616. Switching relay 660 thereupon, at its preliminary make contacts 669A locks through its upper winding in series with rotary magnet, which will not reoperate in this circuit. Switching relay 660 also at contacts 669B connects direct ground to test wiper 603 to mark the selected succeeding switch busy to the other first selectors, at contacts 669 disconnects interrupter relay 670 to prevent its reoperation, at contacts 665 and 666 disconnects the vertical and release magnets 675 and 690, and at contacts 661, 662 and 663 extends the talking conductors through line wipers 601, 602 to the selected switch.

Line relays 610 and 620 respond also to the succeeding digits of the call number. Contacts 611 of line relay 610 now repeat these digits over the negative talking wire and wiper 601 to the succeeding switches to complete the connection in known manner. This circuit is from ground through contacts 632, 623, 611 and 662 to wiper 601 and thence to the line relays of the succeeding switches, which are connected in turn to the negative talking wire, as the call progresses. Transfer relay 650 operates as before on the first pulse of each digit, from ground through contacts 644, 613 and 635, and releases after the last pulse of each digit. Vertical magnet 675 is not affected however, since its circuit is open at contacts 665.

When the conversation is completed, both parties hang up. If the called party hangs up first, the local connector returns battery over the positive talking wire for controlling the registration. When the calling party now hangs up, line relays 610 and 620 restore and open the circuit to release relay 630 which holds for a short period. At the same time contacts 613 re-close the circuit to transfer relay 650 which accordingly reoperates. Contacts 611 also re-connect ground to the negative talking wire, but this is without effect. Release relay 630 then restores, and at contacts 633 completes a circuit to meter relay 640, from battery from the connector on the positive talking wire, via line wiper 602, contacts 663 and 633 to ground through the winding of relay 640. Release relay 630 also at contacts 631, 632 connects transfer relay 650 to the negative talking wire in place of ground, at contacts 635 opens the local circuit to relay 650, at contacts 636 prepares a circuit to the release magnet 690, at contacts 637 prepares the idle marking circuit, at contacts 638 removes one of the grounds from the 100 ohm resistor, and at contacts 639 removes its locking ground from switching relay 660, which is now held operated only by contacts 655 of transfer relay 650.

Meter relay 640 operates quickly responsive to the closure of its circuit, at contacts 642 disconnects transfer relay 650 from the negative talking wire, and at contacts 643 connects a low resistance ground through the 50 ohm and 250 ohm resistors in parallel to test wire 193. This causes an increased current flow over cable 195, wiper 174, contacts 155, 137, relay 110, contacts 104, and wiper 23 of the primary switch to the calling subscriber's call meter, not shown, which operates. Transfer relay 650 then releases, and at contacts 655 opens the locking circuit to the upper winding of switching relay 660, and at the same time removes ground from test wiper 603 to release the succeeding switches.

Switching relay 660 thereupon releases and at contacts 661, 662, 663 disconnects the line wipers 601, 602 and opens the circuit of meter relay 640. Relay 660 also at contacts 668 removes another ground from test wire 193, and at contacts 666 closes another point in the release circuit. Meter relay 640 restores slowly, in response to the opening of its circuit, and, at contacts 643 removes the last ground from the incoming test wire 193 to permit the release of the preceding switches. Relay 640 further, at contacts 644 completes the selector release circuit from ground through contacts 644, 613, 636, 666, and off-normal contacts 676 to battery through release magnet 690. The release magnet thereupon operates and releases the switch, test wiper 603 being disconnected during the release by a pair of break contacts 691 on the release magnet. When the wipers have been released back off the bank, the rotary off-normal contacts 623, 622 resume their normal illustrated position, and when the wipers have been completely restored, the vertical off-normal contacts 615, 616, 625, 626, and 676 resume their normal illustrated positions.

The primary lineswitch releases in response to the removal of the last ground from test wire 193 by make contacts 643 of the meter relay 640. Test relay 110 of the secondary lineswitch also releases, and at contacts 111 releases switching relay 100. Relay 100 in turn, opens the talking wires at contacts 101, 102, and at contacts 106 unlocks and releases kickoff relay 130. All of the equipment is now again normal, and ready for another call.

If the call had not been answered, there would have been no battery returned from the connector over the positive wire, and consequently meter relay 640 would not have operated, and the call would not have been recorded. Release magnet 690 in Fig. 6 would accordingly have operated as soon as switching relay 660 restored, and the switch would have been released a fraction of a second sooner than is the case where the call has been completed.

This selector is also arranged to block the release in case the called party remains on the connection after the calling party has hung up. This requires only that the connector return ground over the negative talking conductor as long as the called party remains on the connection. In such a case, the release of the selector line and release relays 610 and 630 responsive to disconnection by the calling party, completes a holding circuit for transfer relay 650. This holding circuit is from the stated ground on the negative talking wire through line wiper 601, contacts 662, 611, 623, 631, 664, 642, and the winding of relay 650 to battery. Transfer relay 650 accordingly remains operated instead of operating only momentarily, as in a normal release, and at contacts 655 holds switching relay 660. Relay 660 in turn, at contacts 668 and 669B holds both the preceding and succeeding switches in position. At the same time, an alarm circuit is closed from ground through contacts 644, 613, 636, 666A and individual lamp 673 to the SUP2 wire leading to alarm equipment not shown. The lamp lights, and after an interval an audible alarm sounds. An attendant then comes in on the connection, as by plugging a headset into a test jack usually provided on each switch, and talks with the called party. If the called party wants the call traced, the attendant will comply. If there is no response from the called party, the attendant will release the call manually, or take such other action as seems advisable.

*All selectors busy*

If all local selectors are busy at the time a local call is attempted, test wiper 174 of the secondary lineswitch will encounter only 450 ohm ground or no ground, as it steps over the contact sets of the second portion of the bank arc. Test relay 110 will therefore not operate, and the secondary switch will therefore not stop, but will speed on to the third section of the bank arcs, to which the busy bridge circuits are connected.

In the secondary lineswitch, it will be recalled, relays 120 and 130 are in the operated position during the high speed stepping on local calls, and relays 100 and 110 are in the released position. An examination of Fig. 7 will also show that idle busy bridges are marked with 350 ohm ground from contacts 723 on the associated test wire 198, and direct ground from contacts 722 on the associated positive loop wire 197. As soon therefore, as the wipers of the speeding lineswitch find such markings, the lineswitch's test and supervisory relays 110 and 150 are operated thereby, to stop the stepping, and indicate the trouble condition. Test relay 110 will operate first, from the ground on test wire 198, by way of test wiper 174 and contacts 155, 137, and 123, and at contacts 112 opens the steping circuit and at contacts 111 reoperates switching relay 100. Switching relay 100 thereupon at contacts 101 and 102 extends the calling line loop to the selected busy bridge, and at contacts 102 also completes a circuit from the stated ground on the positive loop wire 197 to the upper winding of supervisory relay 150, by way of wiper 172 and contacts 102, 121 and 131.

Supervisory relay 150 upon operating over this circuit, at preliminary make contacts 151 locks to ground from make contacts 106 and 124, although relay 120 releases shortly thereafter due to the opening of contacts 105, and opens contacts 124. Supervisory relay 150 also at contacts 154 and 155 transfers the circuit for test relay 110 from wiper 174 to wiper 175, and at contacts 152 and 153 disconnects direct ground from supervisory lamp 159 and substitutes resistance ground, thereby causing lamp 159 to burn with reduced brilliancy.

In the busy bridge circuit, line relay 710 operates in response to the extension of the line loop, and operates relay 730. Relay 730 in turn operates relay 720, which at break contacts 722 and 723 removes the original grounds from wires 197 and 198, and at make contacts 721 connects busy tone through condenser 728 to the calling line. This busy bridge is now marked busy to the other secondary switches, by ground from make contacts 732 through 450 ohms on test wire 198.

When the calling party hangs up, after receiving the busy tone, the busy bridge line relay 710 restores, and opens the circuit to relay 730 which also restores and opens the circuit of relay 720. During the interval between the release of these latter two slow relays, with 730 normal and 720 still operated, there is no ground on test wire 198. Test relay 110 thereupon restores and disconnects relay 100, which is adjusted to release before relay 720. Relay 100 upon releasing, unlocks and releases relays 130 and 150.

If the wipers of the secondary switch are standing on the bank terminals of a selector or busy bridge circuit at the time it is seized by a calling subscriber, relay 120 will operate in the usual way to start the stepping, but test relay 110 will not be affected by any possible grounds coming through test wipers 174 or 175, due to the open contacts 137 and 154; nor will relay 130 be affected, due to the open contacts 103. The switch will therefore proceed to step around the bank, with the aid of interrupter relay 160, until it reaches the first part of the bank arc, where it will proceed to hunt for low resistance ground on test wiper 173 coming from a free discriminating repeater, in the manner already explained.

*Permanents*

If dialing does not begin within a reasonable time following the seizure of a repeater, timing equipment will cause the release of the seized repeater and outgoing trunk after a predetermined interval, by means of ground pulses on timer wires P1 and P2 in Fig. 2, from an interrupter or timer, not shown. Following the operation of seizure relay 230, a ground pulse on timer wire P1 after a certain length of time will cause the operation of timing relay 210, by way of contacts 232, 213, 264, and 326. Relay 210 thereupon, at contacts 212 locks to ground at contacts 233, at contacts 211 prepares a circuit for relay 150, and at contacts 214 connects kickoff relay 200 to timer wire P2.

Some time thereafter a second ground pulse on timer wire P2 causes the operation of kickoff relays 200 and 130 in series, via contacts 214, wiper 174, and contacts 155, 136 and 103. Kickoff relay 200 upon operating, at contacts 203 locks to ground at contacts 233, at contacts 205 starts the release of the trunk circuit, at contacts 202 opens the test circuit to relay 110, and at contacts 201 connects direct ground from contacts 343 to the positive talking wire 182. Kickoff relay 130 upon operating, at contacts 141 locks to ground at contacts 106 and 124, at contacts 142 prepares the high speed stepping circuit, at contacts 140 prepares a holding circuit for start relay 120, and at contacts 138 and 137 further opens the circuit of test relay 110 which restores. Relay 130 also at contacts 137 prepares a new test circuit for relay 110, at contacts 134 closes a temporary holding circuit to the primary line-switch, and at contacts 131 closes the circuit of supervisory relay 150 from ground through contacts 343, 201, 211, line wiper 172, and contacts 121 and 131 and the upper winding of relay 150 to battery. Relay 150 then operates and locks, and at contacts 154 connects test relay 110 to test wiper 175.

Test relay 110 upon releasing disconnects ground from relay 100 and from springs 135 leading to the upper winding of relay 120. Switching relay 100 releases first, and at contacts 105 completes the holding circuit for the lower winding of start relay 120 from ground through contacts 124, 141, resistor 125, and contacts 140. Switching relay 100 also at contacts 101, 102 opens the circuit to the repeater line relays thereby causing the release of the repeater, and at contacts 107 completes the high speed stepping circuit to motor magnet 165, from ground through contacts 124, 107, 112, 166 and 142. The secondary lineswitch now advances its wipers rapidly, under control of the motor magnet interrupter springs 166. Due to the test wipers 173 and 174 now being disconnected at contacts 138 and 155, the secondary switch speeds on past the remaining repeaters and past the selectors, and stops only when test wiper 175 finds a free busy bridge circuit.

Test relay 110 thereupon reoperates from ground at contacts 723 of the idle busy bridge, through the 350 ohm resistor, test wire 198, wiper 175, contacts 154 and 137, relay 110, contacts 123 and rectifier 114 to battery at the primary switch. Relay 110 stops the stepping and reoperates switching relay 100. Relay 100 at contacts 101, 102 then operates the busy bridge relays which in turn put busy tone on the shorted line. Relay 100 also at contacts 105 releases start relay 120, but holds relays 130 and 150 locked operated, from ground at contacts 106. The repeater and the outgoing trunk are now free and can be used by the other subscribers, but this line and its primary switch and the held secondary switch and busy bridge remain held, and the lamp 159 remains lighted at reduced brilliancy, as an indication of this condition at the attendant. These switches will release when the trouble is cleared or when the faulty line is taken out of service.

*Two-digit absorption*

If the system is of a size requiring the absorption of the first two digits of the call number for local calls within the branch exchange, the jumper points A and B in Fig. 3 will be cross-connected to the proper terminals of the minor switch by the jumpers F and G, and the jumper Y in Fig. 2 will be omitted. For this purpose, first digits 25 have been assumed for local locals, since the jumpers F and G are shown connected to bank contacts #2 and #5 respectively.

Let it now be assumed that a branch exchange subscriber has initiated a local call and that in response to the removal of the receiver at the calling station, primary and secondary lineswitches have seized a discriminating repeater and the associated outgoing trunk circuit, together with the associated incoming selector at the main exchange, exactly as already explained.

Therefore, at the conclusion of the ensuing action, which occurs while the receiver is being lifted to the ear, the following relays will be operated: in the secondary switch, relays 100, 110, 120, plus 136; in the repeater, relays 220, 230, 258, 300; in the trunk circuit, relays 410, 430; and in the incoming selector no relays will be operated, but line relay 510 is in condition to receive impulses.

The calling party, upon receiving dial tone from the repeater, through line relay 258, dials the first digit 2 of the wanted local party's call number. The repeater line relays 220 and 258 pulse twice in response, and relay 220 repeats the pulses to the distant line relay 510, and to the minor switch motor magnet 350 in the repeater. The pulsing circuit for line relay 510 is as before from ground through contacts 343, 201, 222, 301 and the negative talking wire, while that for motor magnet 350 is from the same ground through contacts 223, 303 and 321.

In the distant incoming selector, line relay 510 responds to the repeated impulses, and steps vertical magnet 575 two steps, with relays 520, 530 and 540 operating on the first pulse as before. Relays 530 and 540 lock operated but relay 520 releases after the second pulse, and reoperates line relay 510, from ground through contacts 522, 542, 554, 581, 533 and off-normal contacts 535, which close on the first vertical step of the wipers. Line relay 510 now acts as an interrupter relay to step rotary magnet 580, which accordingly rotates the wipers in on the second level of the bank in search of an idle second selector. When such idle selector is found, switching relay 550 operates over the test wiper, locks, stops the rotation, and extends the connection.

In the repeater, motor magnet 350 also responds to the repeated impulses, and steps wiper 370 two steps, while transfer relays 310 and 330 operate as before on the first pulse, and release one after the other following the last pulse. With relay 310 alone restored, momentary circuits are closed through both windings of relays 320 and 260 from ground through off-normal contacts 245 and jumper X, through contacts 236, 314 and 338 to the upper winding of relay 320, and through contacts 338, wiper 370, jumper F, and contacts 262 and 251 to the lower winding of relay 320, and also through contacts 327, 257, 234, off-normal contacts 243, and contacts 269 to both windings of relay 260. Neither relay operates in this circuit, due to being energized in opposition, although the windings of relay 260 are considerably unbalanced by the resistor 247 in series with one winding.

Relay 330 then restores and at contacts 338 opens both windings of relay 320 which remains normal. Relay 330 at the same time at contacts 335 extends the ground from off-normal contacts 243 to the release magnet 360. The minor switch accordingly releases, and again opens off-normal contacts 243 and 245. Contacts 243 in turn, open the circuit to the release magnet, and to both windings of digit counting relay 260. The increased voltage due to the resultant inductive kick in the windings of relay 260 increases the unbalance of the windings, and this relay operates sufficiently to close its locking contacts 267. The relay then operates completely with both windings in series, from ground through contacts 233, cuts off the dial tone, and prepares the circuits for the receipt of the next digit. Contacts 269A of this relay are now without effect, due to the absence of jumper Y.

In response to the second digit 5 of the call number, the repeater line relays pulse five times. Contacts 222 accordingly repeat five impulses over the negative line wire to the second selector, not shown, in the main exchange, which responds similarly to the incoming first selector to select a free switch in the next rank of switches. Contacts 223 at the same time pass five impulses to relay 310 and motor magnet 350. Relays 310 and 330 again operate on the first pulse and release in turn after the last pulse, and magnet 350 steps wiper 370 five steps. The release of relay 310 now closes momentary circuits through both windings of relays 320 and 250, from the ground through contacts 245 and jumper X, contacts 236, 314 and 338 to the upper winding of relay 320, and through wiper 370 and jumper G, and contacts 263 and 251 to the lower winding of relay 320, and also through contacts 327, 257, 234, 243, 268 and 255 to direct battery through the upper winding of relay 250, and to resistance battery through the lower winding of relay 250 via contacts 266 and 253 and resistance 247. Here again, neither relay operates, due to their windings being energized in opposition to each other.

Relay 330 then restores and at contacts 338 again opens both windings of discriminating relay 320 which being balanced is not disturbed by the inductive kick in its windings and remains normal. Relay 330 also, at contacts 335, again operates release magnet 360. The minor switch accordingly again releases, and off-normal contacts 243 open the circuit through the windings of digit counting relay 250. Relay 250 is thereby kicked operated in the same manner as relay 260 and also locks to contacts 233 through its preliminary make contacts 254, with its windings now energized in series. Relay 250 further, at contacts 256 closes a circuit to kickoff relays 200 and 130 in series, from ground through jumper X, contacts 236, 314, 327, 256, 204, 215, relay 200, wiper 174, contacts 155, 136, 103, and relay 130. Relay 200 operates and locks to start the release of the trunk circuit. Relay 130 also operates and locks, to cause the secondary switch to disengage itself from the repeater by releasing relays 110 and 100, while holding relay 120 and the primary lineswitch, as previously described. The release of relays 100 and 110 again closes the high speed stepping circuit, and when a free local first selector is found, relays 110 and 100 reoperate and relay 120 restores. The remaining digits of the local number are dialled, after receipt of the new dial tone from the seized selector, and the call is completed by the local switch train, while the repeater and trunk are released and made available for another call.

If however, the first digit of the number had not been 2, or if the second digit had not been 5, the first such digit indicating that the call was not a local call, would fail to block the operation of discriminating relay 320, by setting the minor switch wiper on a non-jumpered bank contact. Therefore upon the release of transfer relay 310, only the upper winding of relay 320 would be energized, and this relay would operate quickly and lock. Contacts 327 thereupon open and disconnect ground from wire 294. This opens the energizing circuit to the digit counting relays and causes the operation of the proper one in the manner already described. Contacts 327 also block operation of release magnet 360 and the kickoff relays 200 and 130. Relay 320 at the same time, at contacts 321 disconnects motor magnet 350, and at contacts 323 extends the positive talking conductor 182 to the distant switch train which responds to the remaining digits transmitted over the negative talking wire 431, to complete the connection.

*Three-digit absorption*

To provide absorption of the first three digits on local calls within the branch exchange, the jumper points A, B and C in Fig. 3 will be cross-connected to the proper terminals of the minor switch, by the jumpers F, G and H, and the jumpers X and Y in Fig. 2 will both be omitted. In the illustration first digits 259 have been assigned to local calls in such a case, as is indicated by the connection of jumpers F, G and H to bank contacts #2, #5 and #9 respectively.

Let it be assumed therefore, as in the preceding section, that a local subscriber has removed his receiver to initiate a local call, and that primary and secondary lineswitches have functioned as previously described, to seize a free repeater and trunk, and an associated incoming selector at the main exchange. Accordingly, relays 100, 110, 120, 186, 220, 230, 258, 300, 410 and 430 will be operated, and all others will be normal.

In response to the first digit 2, the repeater line relays 220 and 258 pulse twice as before, and repeat two impulses to the incoming selector line relay 510, and to the repeater motor magnet 350, from pulsing contacts 222 and 223 respectively. In the selector, line relay 510 repeats the pulses to vertical magnet 575, which raises the wipers to the second level. The selector then rotates automatically, with the aid of line relay 510, serving as an interrupter relay, and when an idle second selector is found, switching relay 550 operates to extend the connection. In the repeater, motor magnet 350 steps wiper 370 two steps, while transfer relays 310 and 330 operate and hold during the pulsing, in the usual manner. The release of relay 310 then energizes both windings of the differentially connected discriminating and counting relays 320 and 260 via contacts 338 and 327 and jumper F, over circuits previously traced. Due to the omission of jumper X however, these circuits now have only a single source of ground, that from off-normal contacts 245. Relays 320 and 260 remain unoperated, and the release of transfer relay 330 shortly thereafter, de-energizes discriminating relay 320, and releases the minor switch. Off-normal contacts 245 thereupon open the circuit to counting relay 260, which snaps operated and locks with its windings in series, as before.

In response to the second digit 5, the repeater line relays pulse five times and repeat five impulses to the distant seized second selector not shown, and to motor magnet 350, from contacts 222 and 223. The distant selector in response raises its wipers to the fifth level, and rotates automatically in search of a free third selector which it then seizes. In the repeater, transfer relays 310 and 330 again operate from the pulses, while motor magnet 350 steps wiper 370 five steps. Transfer relay 310 again restores after the last pulse, and energizes both windings of discriminating relay 320 and counting relay 250, from ground through contacts 245, 236, 314, 338, wiper 370, jumper G, contacts 263 and 251 to the windings of relay 320, and contacts 327, 257, 234, 243, 268 and 255 to the windings of relay 250. Transfer relay 330 then restores and deenergizes discriminating relay 320 and releases the minor switch. Off-normal contacts 243 and 245 thereupon simultaneously open the circuits of release magnet 360 and counting relay 250. Magnet 360 thereupon releases, but the unbalanced windings of counting relay 250 cause it to operate from the inductive kick and lock.

In response to the third digit 9, the repeater line relays pulse nine times, and repeat nine impulses to the distant seized third selector not shown, and to motor magnet 350. The distant selector in response, raises its wipers to the ninth level, and rotates automatically over this level in search of a free switch in the next rank of switches, which it seizes. In the repeater, transfer relays 310 and 330 operate from the pulses once more, and motor magnet 350 steps wiper 370 nine steps. Transfer relay 310 then restores, and once again energizes both windings of discriminating relay 320 from off-normal ground through contacts 314 and 338 to the upper winding, and through wiper 370, jumper H and contacts 252 to the lower winding. Contacts 314 at the same time extend this ground to kickoff relays 200 and 130 in series, by way of contacts 327, 256, 204 and 215. Relays 200 and 130 operate over this circuit and lock and cause the secondary switch to release the repeater, and to seize a local first selector in the branch exchange in the manner previously explained, and the remaining digits of the call number will operate the local switch train alone, and complete the connection to the wanted local party.

With the foregoing arrangement of jumpers, it is seen that the first three digits of the number are absorbed on all local calls. It will also be seen that discriminating relay 320 may be operated, on outgoing calls, on the first, second, or third digit, depending on the number dialled.

If for example, the first digit is anything but 2 there will be no circuit through wiper 370 for the lower winding of relay 320, and when transfer relay 310 restores only the upper winding of this relay will be energized. Relay 320 will therefore operate at once, will open contacts 327 to prevent the release of the minor switch, will open contacts 321 to disconnect the minor switch motor magnet, and will close contacts 323 to extend the talking circuit. Counting relay 260 operates upon the opening of contacts 327, but these contacts now prevent any further operation of the counting relays, and the remaining digits will affect only the distant switches.

Similarly if the first digit is 2, and the second digit is anything but 5, the operation of discriminating relay 320 will be blocked by the circuit through wiper 370 and jumper F, when transfer relay 310 restores after the first digit 2, and when transfer relay 330 restores, it releases the minor switch. Counting relay 260 then operates upon the opening of the parallel circuit through its windings at off-normal contacts 245 and 243 as previously described. The second digit will therefore also step the minor switch, and if this digit is anything other than 5, there will be no circuit through wiper 370 for the lower winding of relay 320. Consequently when transfer relay 310 again restores after this digit, it will close only the upper circuit of discriminating relay 320, and this relay will operate. Contacts 321 will thereupon disconnect motor magnet 350 to prevent further operation thereof, contacts 323 extend the positive trunk wire, and contacts 327 disconnect ground from wire 294. This prevents the operation of release magnet 360 when relay 330 restores, but does cause the operation of counting relay 250. Relay 250 thereupon closes contacts 256 but this is without effect, due to the open contacts 327. The distant switches respond to the remaining digits to complete the connection, but the repeater is not affected except as to the line and transfer relays.

Likewise, if the first two digits are 2 and 5 and the last digit is anything but 9 the operation of discriminating relay 320 will be blocked on the first two digits by the previously described circuits through jumpers F and G, the minor switch will be released, and counting relays 260 and 250 will be operated, in turn, responsive to the release of the minor switch. On the third digit however, there will be no circuit through wiper 370 for the lower winding of relay 320, and this relay will now operate, from the circuit through its upper winding, when transfer relay 310 restores. Break contacts 327 will thereupon open wire 294 and prevent the operation of the kickoff relays or of release magnet 360, while contacts 321 and 323 disconnect the motor magnet and extend the positive talking wire. It is thus seen that this system provides a very high use factor with respect to the possible combinations of digits on outgoing calls to, or through, the main exchange.

What is claimed is:

1. Switching equipment for use in automatic telephone systems comprising a rotary lineswitch and first and second trunk groups accessible thereto, a motor magnet for said switch and two driving circuits therefor, a test relay for said switch and two test circuits therefor, means operated responsive to the seizure of said switch for closing one of said driving circuits, means responsive to said closure for causing said motor magnet to drive said switch at a particular speed to select an idle trunk in said first group of trunks, means for closing one of said test circuits from such selected trunk, means responsive to such closure for operating said test relay, means responsive to said test relay operation for opening said one driving circuit, means in said selected trunk for repeating impulses received thereby via said lineswitch, a kickoff relay for said switch, means in said selected trunk responsive to a particular number of received impulses for operating said kickoff relay, means responsive to said kickoff relay operation for closing the other of said driving circuits, means responsive to such closure for causing said motor magnet to drive said switch at a different speed to select an idle trunk in said second group of trunks, means for closing the other of said test circuits from said last selected trunk, means responsive to such closure for reoperating said test relay, means responsive to said reoperation of said test relay for opening said other driving circuit, and means in said last selected trunk for repeating further impulses received thereby via said lineswitch.

2. Switching equipment as in claim 1, wherein said one driving circuit includes an interrupter relay controlled by interrupter contacts on said motor magnet, and said other driving circuit includes said interrupter contacts exclusive of said interrupter relay for causing said motor magnet to drive said lineswitch at higher speed.

3. Switching equipment as in claim 1, together with a third group of trunks also accessible to said lineswitch and a third test circuit for said lineswitch, means for blocking said closure of said other test circuit in case no trunks are idle in said second trunk group, said second driving circuit being maintained thereby to cause said lineswitch to select an idle trunk in said third group of trunks, means for closnig said third test circuit from said selected trunk in said third group, means responsive to such closure for reoperating said test relay, and means responsive to such reoperation for opening said other driving circuit.

4. Switching equipment as in claim 3 wherein each of said first group of trunks includes a repeater giving access to a distant switch train, each of said second group of trunks includes a selector giving access to a local switch train, and each of said third group of trunks includes a busy bridge circuit for giving a busy signal.

5. Switching equipment for use in an automatic telephone system comprising a rotary lineswitch and a group of repeaters accessible thereto, a selector switch associated with each said repeater, means responsive to seizure of said lineswitch for operating said lineswitch to select an idle one of said repeaters, means in said selected repeater for repeating received impulses corresponding to call-number digits to said repeater's associated selector for extending connections in one direction, an auxiliary switch in said repeater, means in said repeater for also repeating the first ones of said received digits to said auxiliary switch for operating said switch, means for releasing said auxiliary switch automatically after each said first digit of predetermined values repeated to said switch in a predetermined order, a counting device operated in response to each said release, a group of other selectors directly accessible to said lineswitch, a kickoff relay for said lineswitch, a circuit completed responsive to a given number of operations of said auxiliary switch and counting device for operating said kickoff relay, circuits controlled by said operated kickoff relay for reoperating said lineswitch to select an idle one of said other selectors and release said repeater, and means in said selected other selector for receiving and repeating the remaining digits of the call number for extending connections in a different direction.

6. Switching equipment as in claim 5 including a two-winding discriminating relay for said repeater, a first circuit controlled by said first received digits for energizing one winding of said relay at the conclusion of each of said first received digits, a wiper for said auxiliary switch stepped in response to said first received digits, a second circuit controlled jointly by said wiper and said counting device for energizing the other winding of said relay at the conclusion of each of said first received digits of said predetermined values and received in said predetermined order, said relay so wound as not to operate responsive to closure of both circuits and to operate responsive to closure of said first circuit alone following the first received digit not corresponding to said predetermined order and values, and means responsive to said relay operation for disabling said auxiliary switch so that the repeater is held and the remaining digits are repeated thereby to the associated selector to complete a connection therethrough in said one direction.

7. Switching equipment as in claim 5 including a plurality of two-winding counting relays comprising said repeater counting device, a circuit completed at the conclusion of each of said first received digits for energizing both windings of one of said counting relays in opposite directions so that said relay does not operate in response to such energization, off-normal contacts for said auxiliary switch in said circuit opened responsive to each release of said auxiliary switch to open said circuit, and each said counting relay so connected as to operate to prepare the circuit to the next counting relay in response to such opening of said circuit through both said windings.

8. Switching apparatus for use in an automatic telephone system including a step by step rotary lineswitch having access to a group of outgoing repeaters and a group of local selectors, means responsive to seizure of said lineswitch for causing said lineswitch to select a free one of said repeaters, a distant switch associated with said selected repeater, means in said repeater for repeating received impulses corresponding to dialled digits of a call number to said distant switch, means in said repeater for counting the impulses of each of the first received digit or digits, means in said repeater for counting the number of said first received digits, a kickoff relay for said lineswitch, circuits jointly controlled by said two counting means for operating said kickoff relay responsive to a particular number of first received digits of particular values and received in a particular order, means responsive to the operation of said kickoff relay for causing said lineswitch to release said repeater and select a free one of said local selectors, means in said selected local selector for repeating the remaining digits of the call number, a plurality of jumper points in said repeater associated with said two counting means, and said kickoff control circuits so arranged as to operate said kickoff relay after one or more critical digits according to the presence or omission of jumpers at certain of said jumper points.

9. Switching apparatus as in claim 8 including five jumper points in said repeater associated with said impulse and digit counting means, and said jumper points so arranged and located as to enable the operation of said kickoff relay after one, two or three received digits with only three of said jumper points connected up, the number of critical digits required being determined in advance by the location of the three connected-up jumper points.

10. Switching apparatus as in claim 9 wherein three of said jumper points are associated with said impulse counting means and two with said digit counting means, and said control circuits and jumper points so arranged as to cause the operation of said kickoff relay after one critical digit where one impulse counting means jumper point and two digit counting means jumper points are connected up, after two critical digits where two impulse counting means jumper points and one digit counting means jumper point are connected up, and after three critical digits where three impulse counting means jumper points and no digit counting means jumper points are connected up.

11. Switching apparatus for use in automatic telephone systems including outgoing repeaters, local selectors, busy bridges, a rotary lineswitch and a talking circuit, means responsive to the seizure of said talking circuit for causing seizure of said lineswitch, means responsive to such seizure for causing said lineswitch to operate to seize one of said repeaters and extend said talking circuit thereto, a kickoff relay in said lineswitch, circuit means for operating said relay from said seized repeater responsive to a series of impulses representing a call-number digit of a particular value received by said repeater over said extended talking circuit, means responsive to said kick-off relay operation for causing said lineswitch to reoperate to seize one of said local selectors and extend said talking circuit thereto, means for causing said reoperated lineswitch to seize one of said busy bridges and extend said talking circuit thereto responsive to all of said local selectors being found busy, means in said seized busy bridge operated responsive to such extension for connecting busy tone to said talking circuit, a supervisory relay for said lineswitch, circuit means for operating said supervisory relay from said busy bridge over one side of said talking circuit in response to said last extension of said talking circuit, an alarm signal, and means responsive to the operation of said supervisory relay for operating said alarm signal.

12. In switching apparatus as in claim 11, a lamp signal individual to said lineswitch, a start relay for said lineswitch, means responsive to said seizure of said lineswitch for operating said start relay, means responsive to said operation of said start relay for illuminating said lamp signal in one characteristic manner, means responsive to said operation of said kickoff relay for maintaining said characteristic illumination of said signal lamp independently of said start relay, and means responsive to said operation of said supervisory relay for illuminating said signal lamp in a different characteristic manner.

13. Switching apparatus for use in automatic telephone systems comprising outgoing repeaters and local selectors and busy bridges and a rotary lineswitch having access thereto, a pair of speech conductors, means responsive to a short-circuiting of said speech conductors for causing seizure of said lineswitch, means responsive to such seizure for causing said lineswitch to operate to seize a free one of said repeaters and extend said speech conductors thereto, kickoff relays in said seized repeater and lineswitch, a circuit for operating said relays from said seized repeater responsive to a series of impulses representing a particular dialled digit received by said repeater over said extended speech conductors, means responsive to the operation of said lineswitch kickoff relay for causing said lineswitch to reoperate to seize a free one of said local selectors, a timing relay and associated time pulse means for said repeater, said timing relay operated from said time pulse means only in case no dialling follows seizure of said repeater within a given time, means including said operated timing relay for then operating said kickoff relays from said time pulse means only in case no dialling occurs within a further given time, a supervisory relay in said lineswitch, means jointly responsive to the operation of said timing and kickoff relays for operating said supervisory relay from said repeater over one of said extended speech conductors, and means jointly responsive to the operation of said supervisory and kickoff relays for causing said lineswitch to reoperate to release said repeater and seize a free one of said busy bridges.

14. In switching apparatus as in claim 13, a test relay and a switching relay for said lineswitch, means for releasing said relays responsive to the operation of said kickoff relays, means for reoperating said relays responsive to the seizure of said free busy bridge, means responsive to the reoperation of said switching relay for extending said speech conductors to said seized busy bridge, means in said busy bridge operated responsive to such extension for connecting a busy signal to said speech conductors, an alarm circuit, means operated responsive to the operation of said supervisory relay for completing said alarm circuit, and means for locking said lineswitch on said seized busy bridge until said short-circuit has been removed from said speech conductors.

References Cited in the file of this patent

UNITED STATES PATENTS 1,798,495 Radke ---------------- Mar. 31, 1931